(12) United States Patent
Hulick et al.

(10) Patent No.: US 10,795,543 B2
(45) Date of Patent: Oct. 6, 2020

(54) ARRANGEMENT OF A STACK OF ITEMS BASED ON A SEED VALUE AND SIZE VALUE

(71) Applicant: Microsoft Technology Licensing, LLC, Redmond, WA (US)

(72) Inventors: Mitchell Alan Hulick, Redmond, WA (US); Eduardo Sonnino, Vancouver (CA); Anthony Neil Dart, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/829,958

(22) Filed: Dec. 3, 2017

(65) Prior Publication Data
US 2019/0171336 A1 Jun. 6, 2019

(51) Int. Cl.
*G06F 3/0482* (2013.01)
*G06F 9/451* (2018.01)
*G06F 3/01* (2006.01)
*G06F 3/0481* (2013.01)
*G06F 3/0484* (2013.01)

(52) U.S. Cl.
CPC ............ *G06F 3/0482* (2013.01); *G06F 3/017* (2013.01); *G06F 3/04817* (2013.01); *G06F 3/04842* (2013.01); *G06F 9/451* (2018.02); *G06F 2203/04808* (2013.01)

(58) Field of Classification Search
CPC .... G06F 3/04845; G06F 3/0482; G06F 3/017; G06F 3/04842; G06F 2203/04808
USPC .................................................. 715/766, 790
See application file for complete search history.

(56) References Cited

U.S. PATENT DOCUMENTS

| 8,371,921 | B1 * | 2/2013 | Perrone | G07F 17/3293 463/16 |
| 9,478,251 | B2 | 10/2016 | Chaudhri et al. | |
| 2004/0261103 | A1 * | 12/2004 | Ohno | H04N 1/00384 725/38 |
| 2006/0041846 | A1 * | 2/2006 | Masselle | G06F 3/0481 715/793 |

(Continued)

FOREIGN PATENT DOCUMENTS

EP 2455858 A1 5/2012

OTHER PUBLICATIONS

"International Search Report and Written Opinion Issued in PCT Application No. PCT/US2018/061397", dated Feb. 12, 2019, 12 Pages.

*Primary Examiner* — Abdullah Al Kawsar
*Assistant Examiner* — Kenny Nguyen
(74) *Attorney, Agent, or Firm* — Talern IP Law, LLP

(57) ABSTRACT

An object stack feature for graphical user interfaces can include a method for arranging items displayed in a visual interface into a stack where each item of the stack has a corresponding visual representation in the stack. The method can include in response to receiving an indication to stack two or more items displayed in a visual interface, creating a stack object comprising a list of the two or more items and a seed value for an ordered seed. The ordered seed can be supplied to an arrangement function that outputs positions for items in the stack object. An arrangement can be generated using the arrangement function and each of the two or more items can be displayed in the visual interface in the arrangement generated by the arrangement function.

16 Claims, 18 Drawing Sheets

(56) References Cited

U.S. PATENT DOCUMENTS

| | | | |
|---|---|---|---|
| 2006/0214953 A1* | 9/2006 | Crew | G06T 3/40 |
| | | | 345/660 |
| 2009/0138818 A1* | 5/2009 | Nemoto | G06F 3/048 |
| | | | 715/795 |
| 2010/0153844 A1 | 6/2010 | Hwang et al. | |
| 2010/0289753 A1* | 11/2010 | Coddington | G06F 3/0482 |
| | | | 345/173 |
| 2011/0126148 A1* | 5/2011 | Krishnaraj | G06F 3/016 |
| | | | 715/784 |
| 2011/0126156 A1 | 5/2011 | Krishnaraj et al. | |
| 2014/0129988 A1* | 5/2014 | Liang | G06F 3/04815 |
| | | | 715/838 |
| 2014/0344765 A1* | 11/2014 | Hicks | G06F 3/04883 |
| | | | 715/863 |
| 2018/0097990 A1* | 4/2018 | Jayaraj | H04N 5/23222 |

* cited by examiner

ARRANGEMENT OF A STACK OF ITEMS BASED ON A SEED VALUE AND SIZE VALUE

BACKGROUND

Managing large amounts of data across large variations in screen sizes requires graphical user interfaces to include functionality for navigating and organizing content. Graphical user interfaces manage viewing space on a screen through a number of techniques including tools to adjust a viewing window of content to enable some of the content to appear to be "off screen", tabs to allow for moving between windows of content, and folders to group content together.

Current solutions for grouping a number of objects together to move out of the way of other areas of the view screen involve folders. Although folders are useful to group objects together in a place, folders also hide the objects until the folder is opened.

BRIEF SUMMARY

An object stack feature for graphical user interfaces is disclosed herein. Associated technology for providing the feature can include a method for arranging items displayed in a visual interface into a stack, or pile, where each item of the stack has a corresponding visual representation in the stack. The method can include in response to receiving an indication to stack, in front of each other, two or more items displayed in a visual interface, creating a stack object comprising a list of the two or more items and a seed value for an ordered seed. The ordered seed can be supplied to an arrangement function that outputs positions for items in the stack object. An arrangement can be generated using the arrangement function and each of the two or more items can be displayed in the visual interface in the arrangement generated by the arrangement function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An object stack feature for graphical user interfaces is disclosed herein, as well as an associated method for arranging items displayed in a visual interface into a pile, or stack, where each item of the stack has a corresponding visual representation in the stack. The object stack provides a user interface widget that organizes content on digital screens to help manage large amounts of data across large variations in screen sizes.

Advantageously, the object stack technology provides increased user interaction performance as the arrangement of the items in the stack results in a more efficient user interaction. Indeed, the arrangements enable a user to move the items together at one time, easily view the items in the stack, and pull a single item out of the stack to remove it. The technology may conserve processing resources by reducing or eliminating the operations that would otherwise have been performed by a user having to look for items in folders. In some embodiments, battery life may also be conserved by reducing such operations.

Figure 1A:
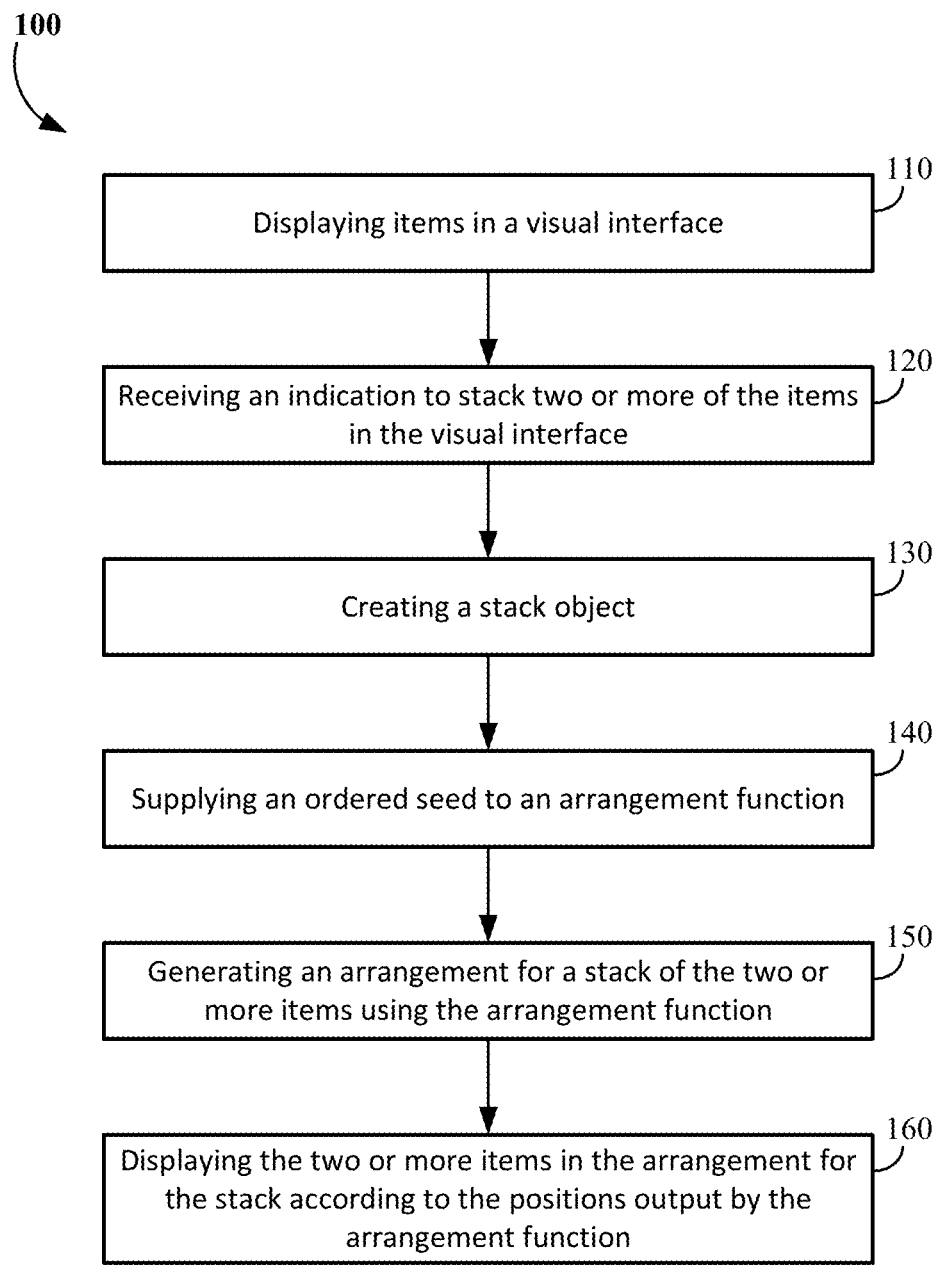
FIG. 1A illustrates a method for creating a stack, or pile, of items in a graphical user interface.
Figure 1B:
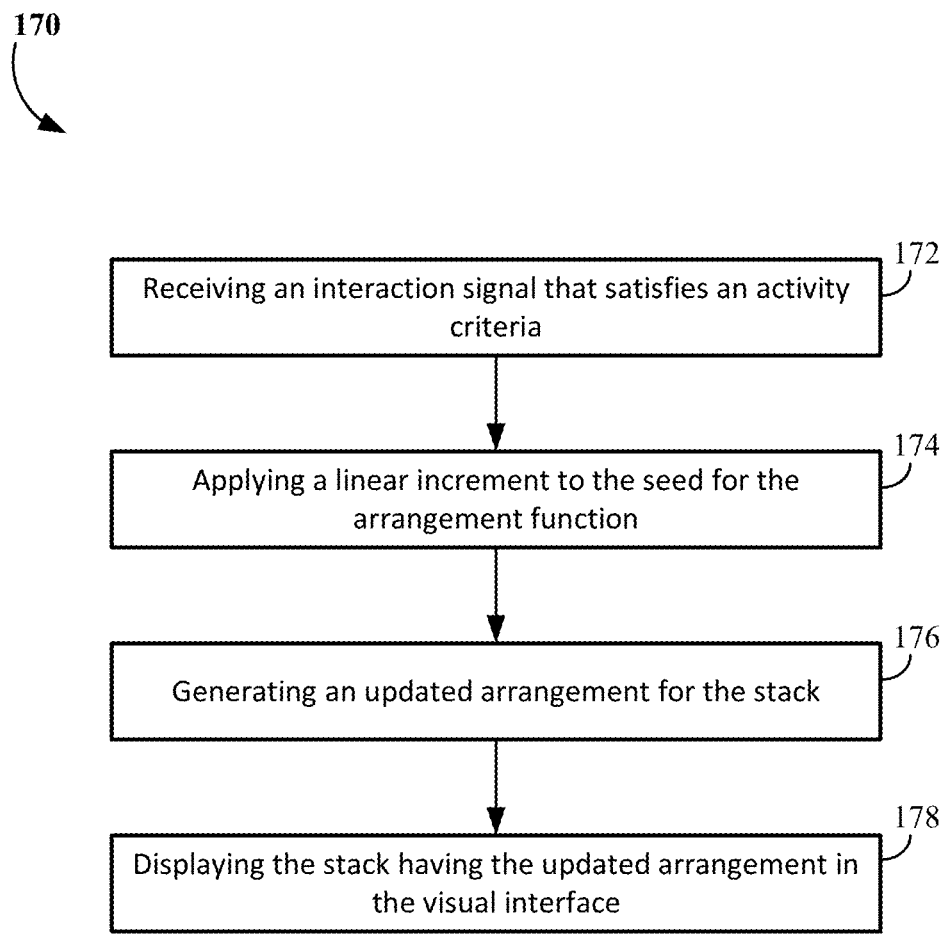
FIG. 1B illustrates a method for updating an arrangement of a stack object.
Figure 2:
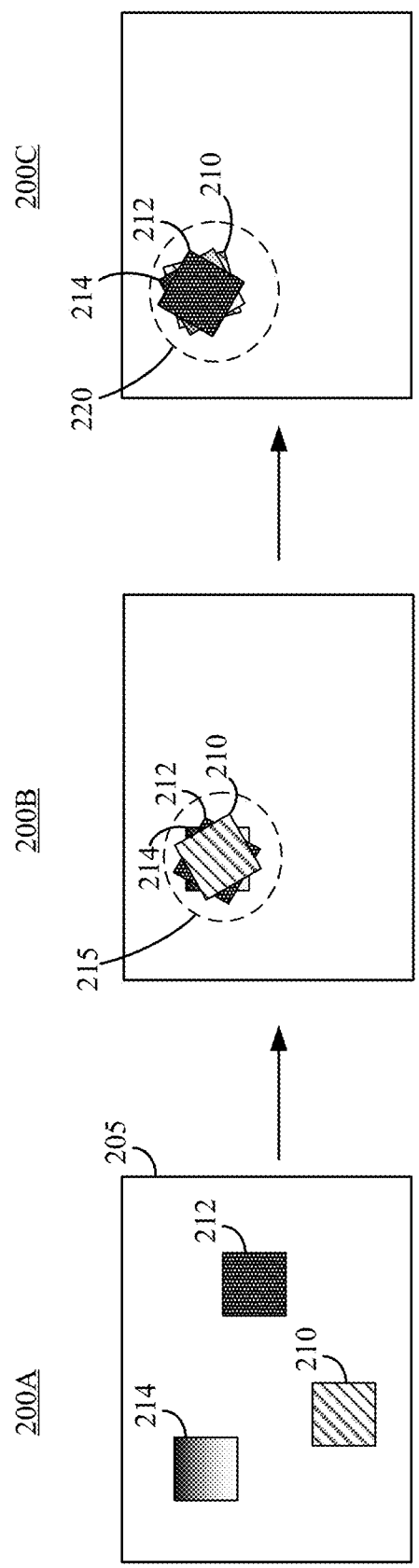
FIG. 2 illustrates results of the processes of FIGS. 1A and 1B.

FIG. 1A illustrates a method for creating a stack, or pile, of items in a graphical user interface; FIG. 1B illustrates a method for updating an arrangement of a stack object; and FIG. 2 illustrates example results of the processes of FIGS. 1A and 1B. Processes 100 and 170 may be implemented in program instructions that, when executed, direct a suitable computing to operate as follows.

Referring to FIG. 1A, for process 100, a system can display (110) items in a visual interface. For example, as shown in FIG. 2, in a first view 200A of a visual interface 205, a number of items can be displayed. In this example, three items are shown: a first item 210, a second item 212, and a third item 214.

Returning to FIG. 1A, the system may receive (120) an indication to stack two or more of the items displayed in the visual interface. The indication can be, for example, a release gesture or command while one of the items is over one of the other items (or over a stack of two or more items). A release gesture can be, for example, a touch gesture where a user removes finger from the item being dragged or a pointing device gesture where a user releases or clicks a pointing device. A release command may be, for example, a verbal command to, as illustration, "stop moving" or "drop an item at <location>". In some cases, the indication can be a multi-finger pinch gesture with respect to the two or more items. In yet other cases, a command icon may be provided to indicate that pre- or post-selected items are to be stacked.

In response to receiving the indication to stack the two or more items, the system can create (130) a stack object. A stack object includes a list of the items and a seed value for an ordered seed. In some cases, the stack object can further include a size value. The system supplies (140) the ordered seed to an arrangement function that outputs positions for items in the stack object; and generates (150) an arrangement for a stack of the items using the arrangement function. When a size value is included for the stack object, the size value can be used to scale items of larger size and/or smaller size; and, in some cases, create a padding for items of smaller size. The system can then display (160) the two or more items in the arrangement for the stack according to the positions output by the arrangement function.

For example, returning to FIG. 2, in a second view 200B of the visual interface 205, the first item 210, second item 212, and third item 214 are displayed in a stack 215 according the arrangement generated by the arrangement function. Examples of arrangements that can be used for the stack are shown in FIGS. 3A-3I, described in more detail below.

Turning to FIG. 1B, a property of the stack object includes process 170, where the stack object can generate new arrangements when certain interactions take place with respect to the visual representation of the stack. For example, the system can receive (172) an interaction signal that satisfies an activity criteria with respect to the stack. Examples of the activity criteria include a front to back move of an item or group of items, a back to front move of an item or a group of items, or a bump interaction with the stack. An interaction signal may be gestures or commands that alone or in combination perform a particular activity. The activities with respect to the stack may be monitored to determine whether an activity occurred that satisfied the activity criteria for the described feature.

Since the seed is ordered, a linear increment can be applied that enables some of the items to change position and other of the items to remain in the same position at the change of the seed.

In response to receiving the interaction signal that satisfies the activity criteria, the system can apply (174) a linear increment to the seed value of the ordered seed for the arrangement function, generate (176) an updated arrangement for the stack, and display (178) the stack having the updated arrangement in the visual interface. Other examples of activities that can cause an increment include, but are not limited to, actions of explode view, move, swap, and change.

An example updated arrangement is shown in the third view 200C in FIG. 2, where the activity criteria was moving the first item 210 to the back; and the resulting updated arrangement changed the rotation of the first item 210 and the third item 214, but kept the rotation of the second item 212 the same even though it was moved to the front of the stack 220.

More than one stack of items can be created. Two stack objects can have a same seed or different seed. The seed for each stack is used to have a sense of history and reproducibility and increments upon a certain activity.

The object stack feature can have one or more of the following properties: all objects in the stack are changed to be a similar size; stacked items can be moved together at one time (e.g., appearing as a single 'item'); a user can 'flick' to swipe through the items in the stack, where the front item moves to the back or the back item moves to the front; the stack can 'explode' when tapped and the items can be viewed in a grid, gallery or list view; a single item can be pulled out to remove it from the stack; ink on top of an item is displayed when that item is on the top of the stack, but hidden when in a back position; sizes of the items can be changed, including in a larger or smaller size.

FIGS. 3A-3I illustrate stack arrangements that can be generated using various arrangement functions. Five categories of arrangement types are shown: Crest, Random, Alternating, Perturbed Alternating, and Scattered Alternating.

Figure 3A:
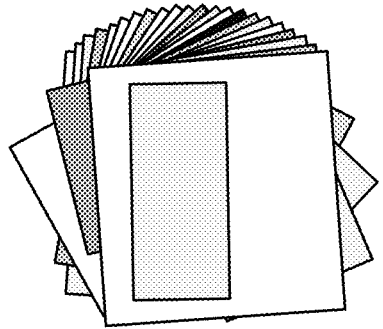
FIGS. 3A-3I illustrate stack arrangements that can be generated using various arrangement functions.
Figure 3B:
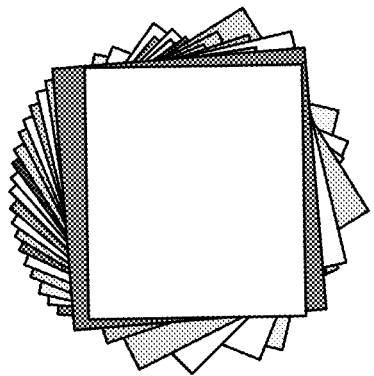
Figure 3C:
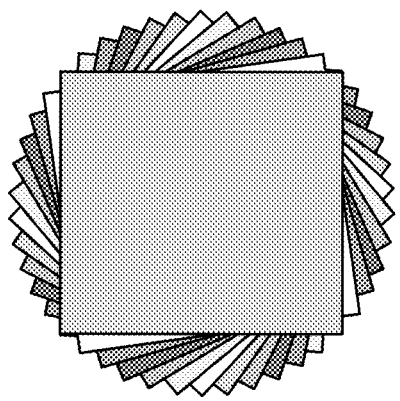

Referring to FIGS. 3A-3D, an arrangement function can generate a crest pattern. The crest pattern entails a standard rotation pattern. The crest pattern can be generated for the visual representation of the stack by generating a first orientation position for a front item of the stack; and for each item in the stack behind the front item, in an order of the items in the list of items of the stack object, rotating the orientation of the item in a first direction by an increment. The increment can be a set size or may vary according to a specified formula or pattern. The front item may be positioned upright or may be assigned a position based on the seed value. FIGS. 3A and 3B illustrate the crest pattern where the items are different sizes. In FIG. 3A, it can be seen that items behind the front item are positioned in a manner that ensures that every item has a visible portion. FIG. 3C illustrates the crest pattern when the items are the same size. The when the items are large enough to be easily clicked individually, the crest also allows multiple items of the stack to be easily moved out of the way.

Figure 3D:
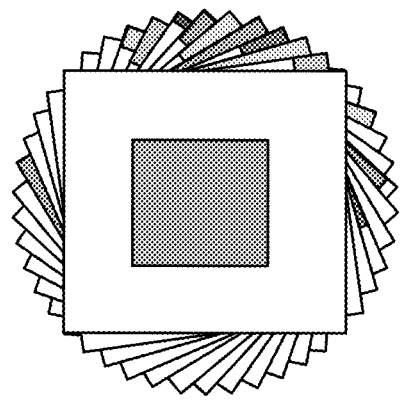

If the items have a wide variance in size, a pad can be applied to make the items fill a same size, as illustrated in FIG. 3D. The padding can be just on the front-most item, or on all of them. In some cases, the padding can have a border. In some cases, the padding can be partially transparent. In the case shown in FIG. 3D, it can be seen that items are moved within the padding such that they are centered when in front, but in the corner while in their crest. In this manner, the stack object feature can make a uniform shaped layer in the stack while making sure the content is visible by aligning the item to a top corner of the pad when not in the front position. The padding can be applied to the other arrangement patterns described below. In some cases, instead of a pad, shadows cast behind the item can be used.

Figure 3E:
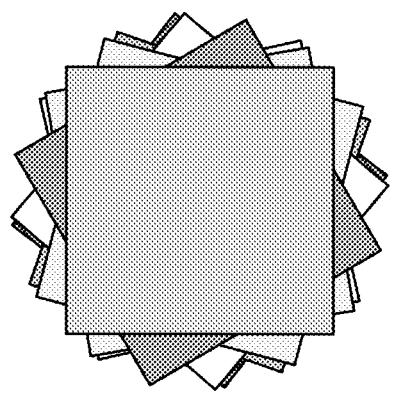
Figure 3F:
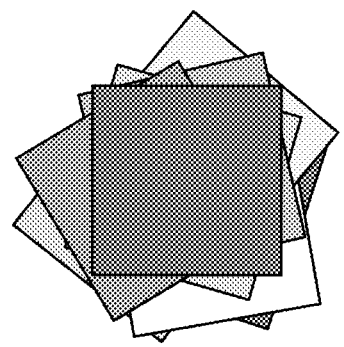

Referring to FIGS. 3E and 3F, random arrangements can be implemented. Referring to FIG. 3E, items may be given random rotations; and, optionally, keeping the front-most item upright. Referring to FIG. 3F, in addition to random rotations, a random translation, or scatter, can be applied. Pure random rotation (and/or random translation) may end up hiding an item, creating a "clumping" effect, which is not desirable. Therefore, as an approach that can be taken when using random arrangement functions, a restriction can be applied that checks to see if any items are overlapping and if two items have overlapping positions, the second item's position is skipped, and that item is moved to the next, non-overlapping position. As another approach, after placing each item, a probability curve can be created so subsequent items are unlikely to be placed near existing items.

Figure 3G:
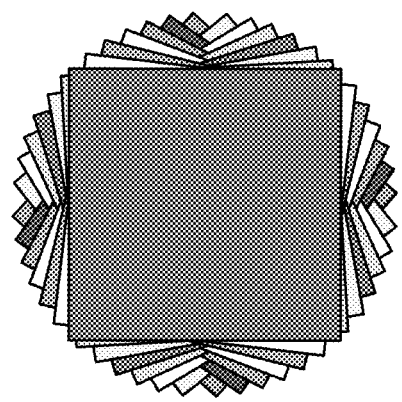

Referring to FIG. 3G, an arrangement function can generate an alternating arrangement. The alternating arrangement can be generated for the visual representation of the stack by generating a first orientation position for a front item of the stack; and for each item in the stack behind the front item, alternating between rotating the orientation of the item in one direction by an increment and rotating the orientation of the item in an opposite direction by the increment. The increment can be a set size or may vary according to a specified formula or pattern. The front item may be positioned upright or may be assigned a position based on the seed value.

Figure 3H:
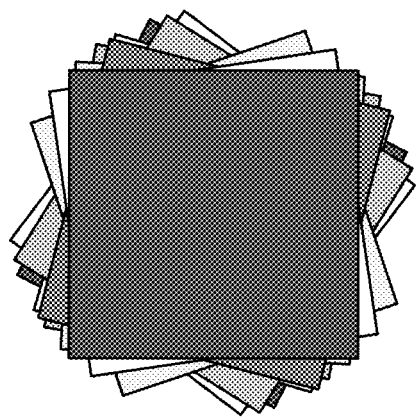

A small amount of random rotation can be added to the alternating arrangement to generate a perturbed alternating rotation pattern as shown in FIG. 3H. The perturbed alternating rotation pattern can be generated for the visual representation of the stack by generating a first orientation position for a front item of the stack; and for each item in the stack behind the front item, in an order of the items in the list of the two or more items, alternating between rotating the orientation of the item in one direction and rotating the orientation of the item in an opposite direction by the increment, wherein a degree of rotation for the rotating of the orientation of the item is random.

Figure 3I:
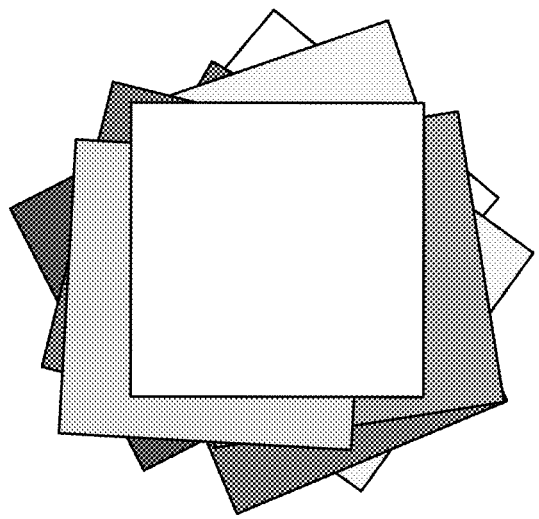

In yet another implementation, instead of random rotation, random translation (or "scatter") can be applied, as shown in FIG. 3I. The scattered alternating rotation pattern can be generated for the visual representation of the stack by generating a first orientation position for a front item of the stack; and for each item in the stack behind the front item, in an order of the items in the list of the two or more items, alternating between rotating the orientation of the item in one direction and rotating the orientation of the item in an opposite direction by the increment, and applying a random translation. Although not shown in the drawings, in some implementations, a perturbed and scattered pattern may be used, where some random translation and random rotation are applied to an alternating rotation pattern.

In some cases, the closer an item is to the front, the closer it is to being upright. This means that when the front item is moved to the back, the next item can be animated with a small movement to become upright in front.

Animations can include one or more of the following. When dragging an item, the item can be tilted, and the tilt can be changed based on location. Multiple items can be simultaneously dragged. In some cases, it can be enforced that only the front item can be manipulated. When the front item is dragged a small amount, the front item can be animated back to the starting position or swapped to the back. Distances items are scattered can be based on how many items there are, or be scattered by a constant amount. Resistance can be applied when an item is pulled too far from the group, slowing down the ability to drag the item away from the stack. The animation can be "springy" or linear. The physicality of the visual representations of the items can be respected or not. In other words, when swapping to the next item, the front item can go around or pass through the other items. Going around makes the item seem more "real". Going through makes for a faster animation.

Figure 4A:
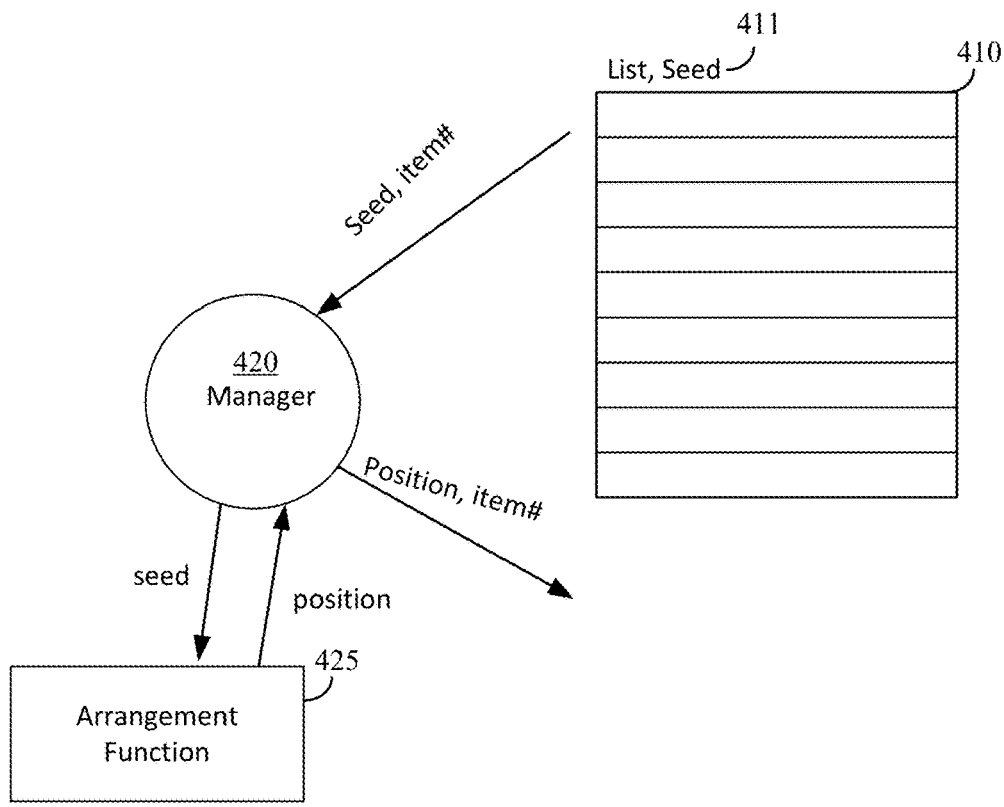
FIGS. 4A and 4B illustrate system operation according to an example representation.
Figure 4B:
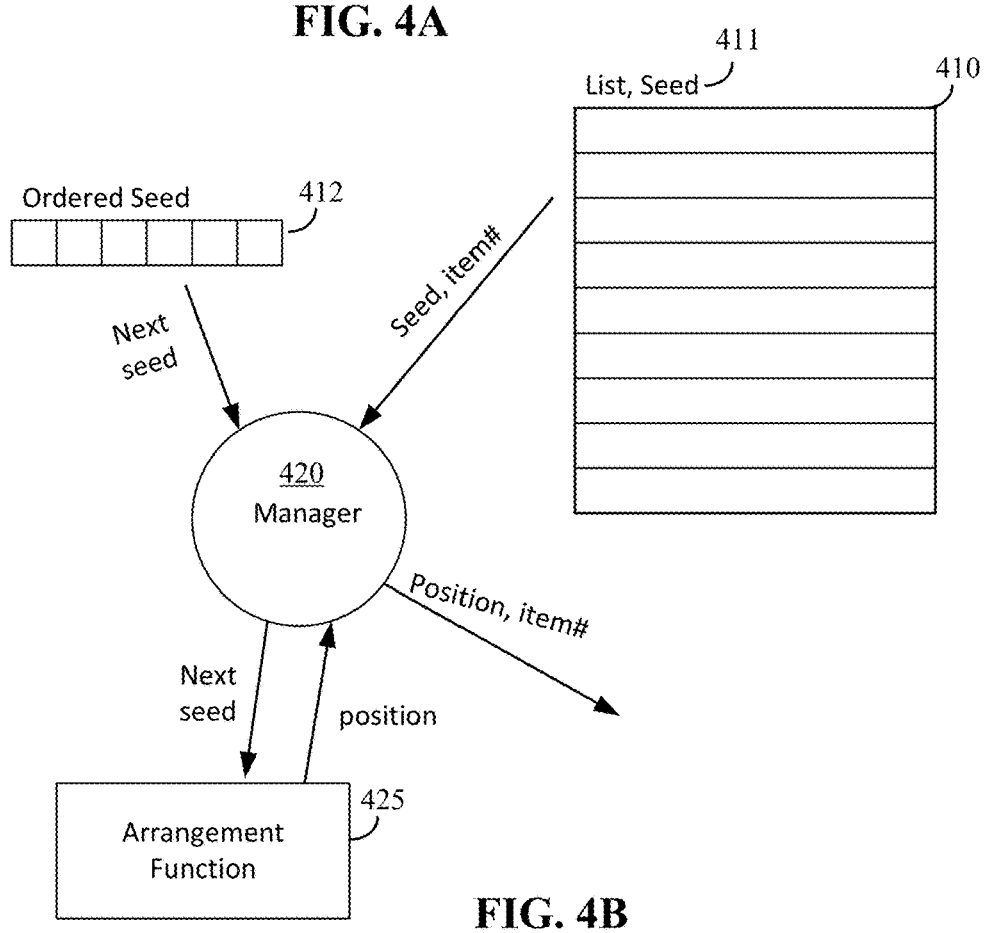

FIGS. 4A and 4B illustrate system operation according to an example representation. As shown in FIGS. 4A and 4B, a stack object feature can include a list of items 410, a seed value 411 for an ordered seed 412, a manager 420 (that can include the logic for operating the stack object feature), and an arrangement function 425. Referring to FIG. 4A, the manager 420 can supply the seed value 411 to the arrangement function 425 and take position information output from the arrangement function 425 to provide the positions for the items of the list of items 410. Referring to FIG. 4B, when an interaction signal is received that satisfies an activity criteria, the manger can get a next seed of the ordered seed 412 and supply that next seed to the arrangement function 425. The position information output from the arrangement function 425 is used to provide the positions for the items of the list of items 411. In some cases, the manager 420 can determine whether to keep all, none, or some of the items still in response to receiving an interaction satisfying an activity criteria. In other cases, such as when there is no manager 420, the movement of none, one, some, or all items may be purely a property of the arrangement function, made possible by the ordered nature of the seeds.

Figure 5A:
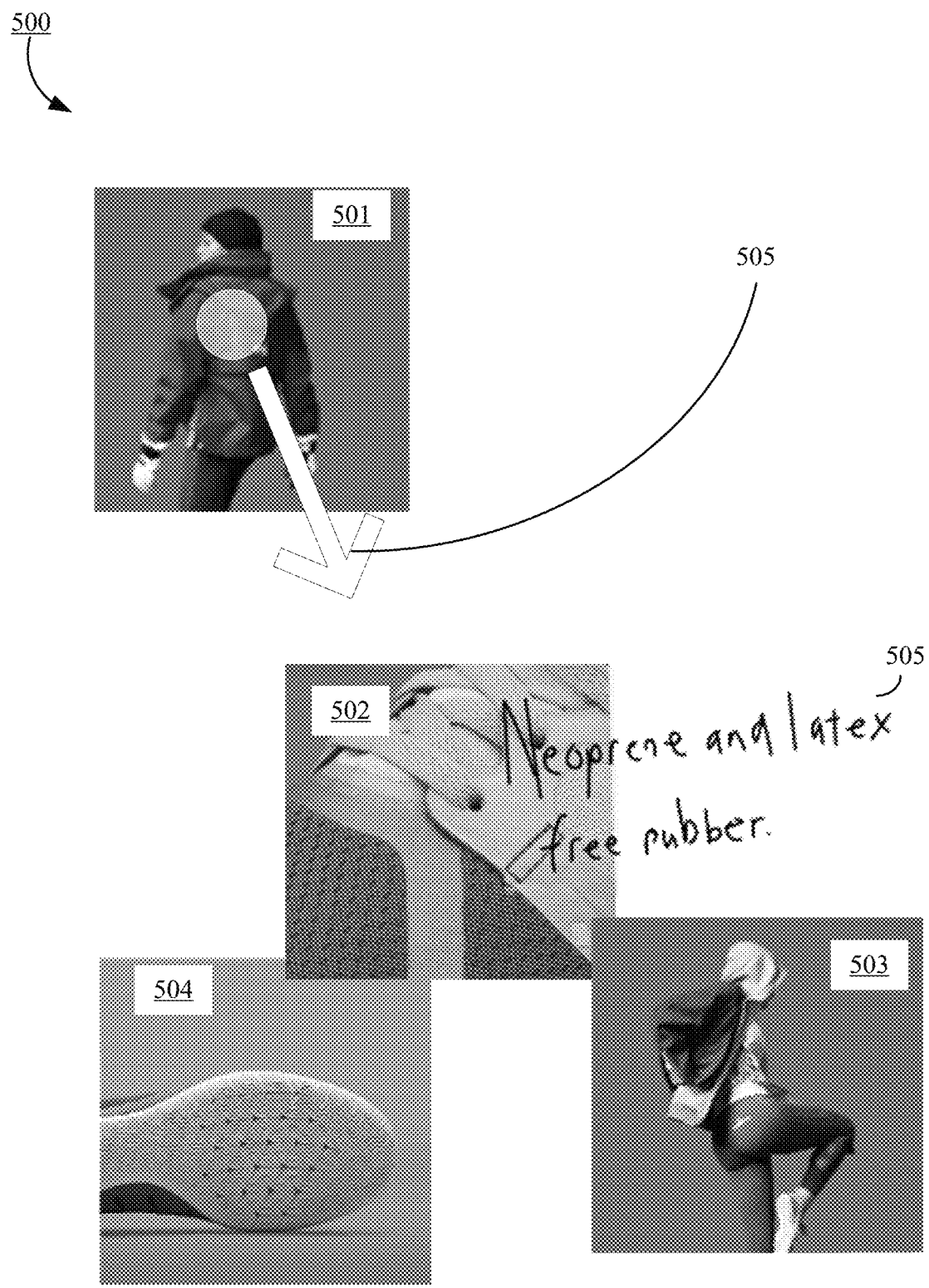
FIGS. 5A-5N illustrate an example implementation scenario of object stacks.
Figure 5B:
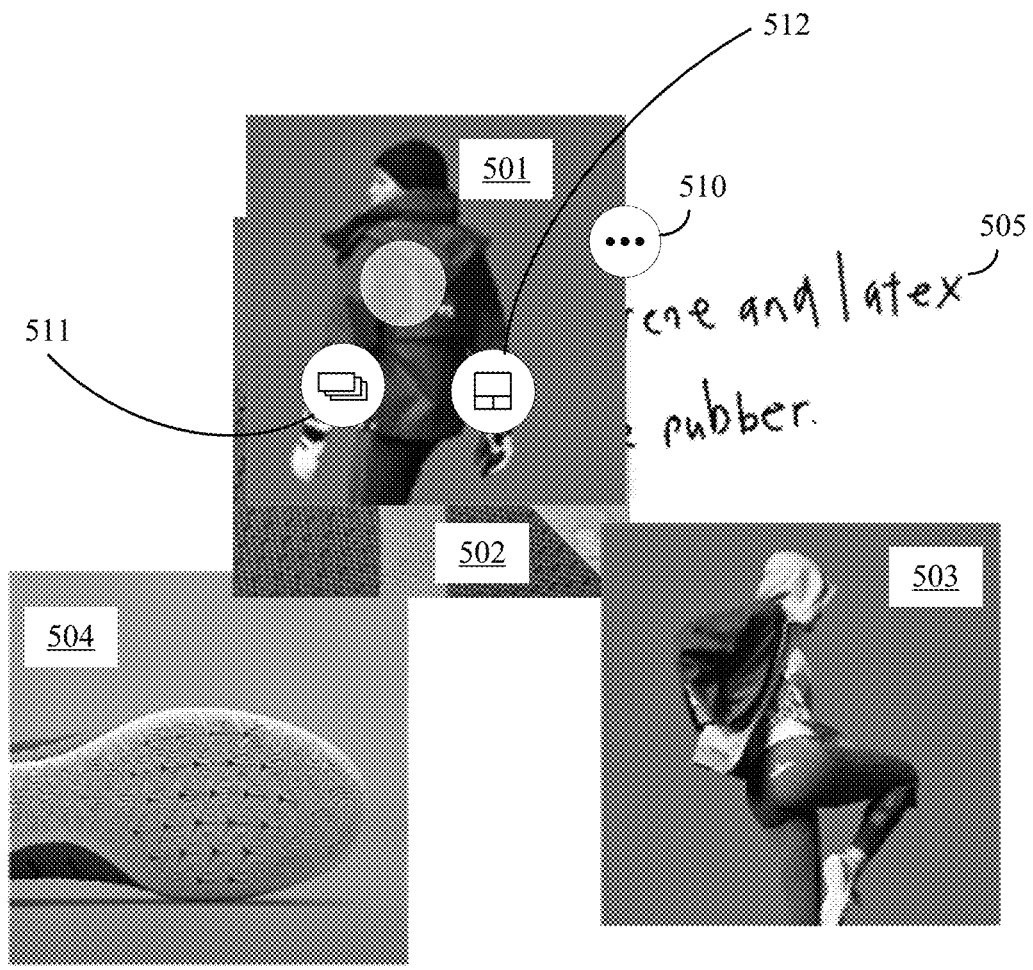
Figure 5C:
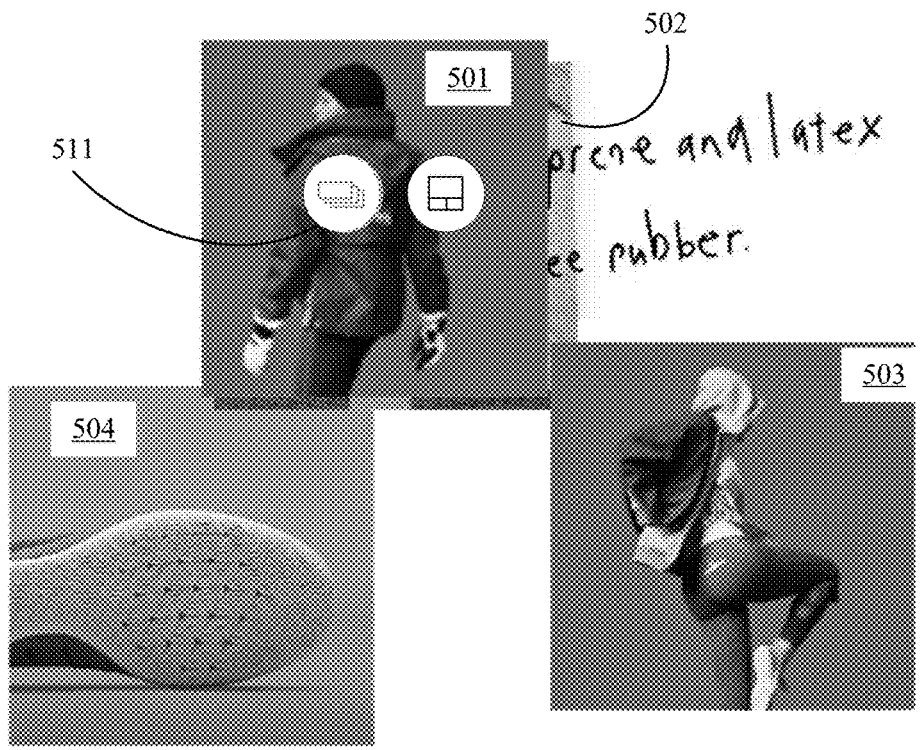
Figure 5D:
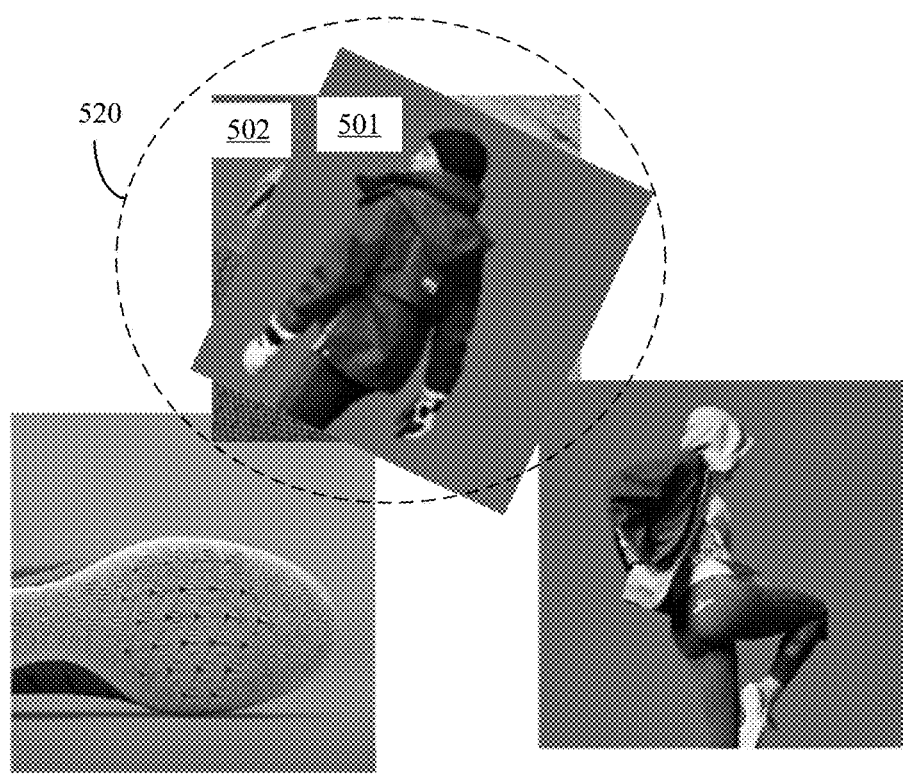
Figure 5E:
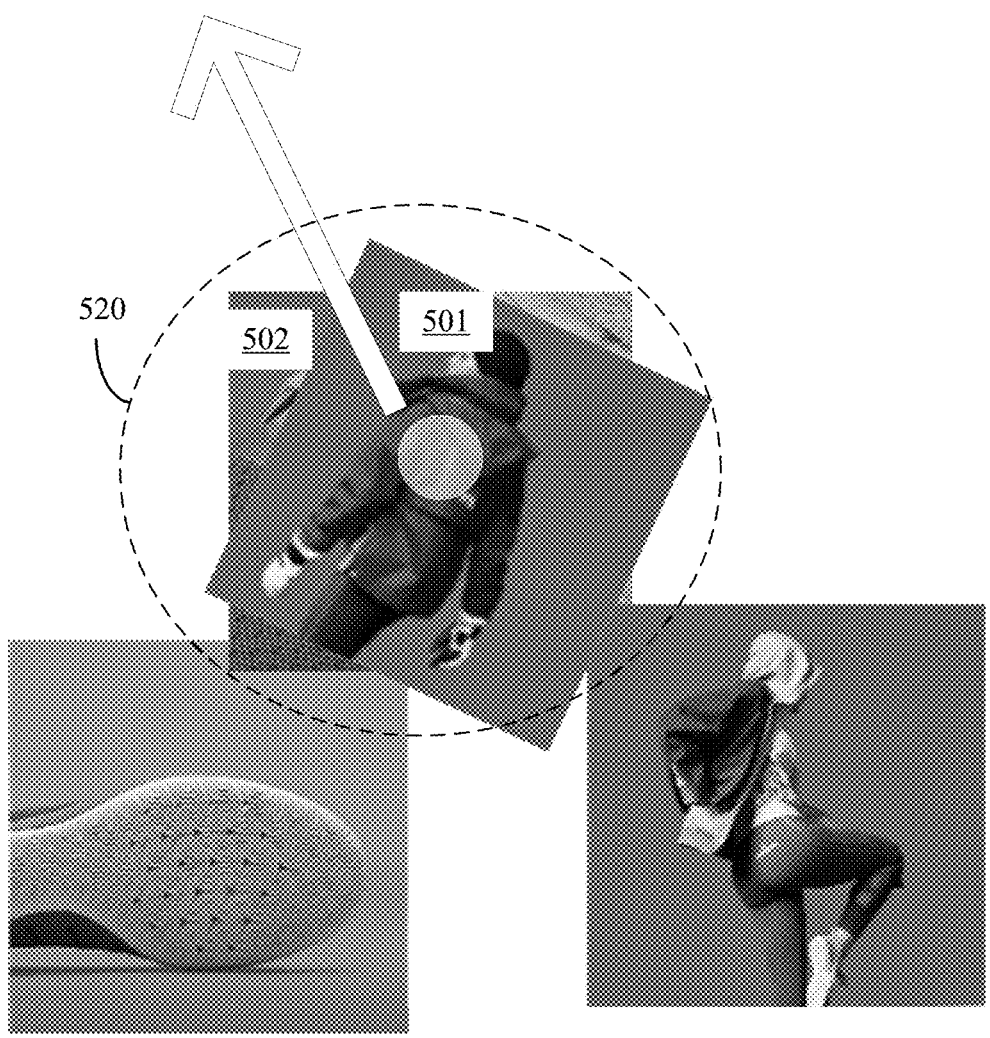
Figure 5F:
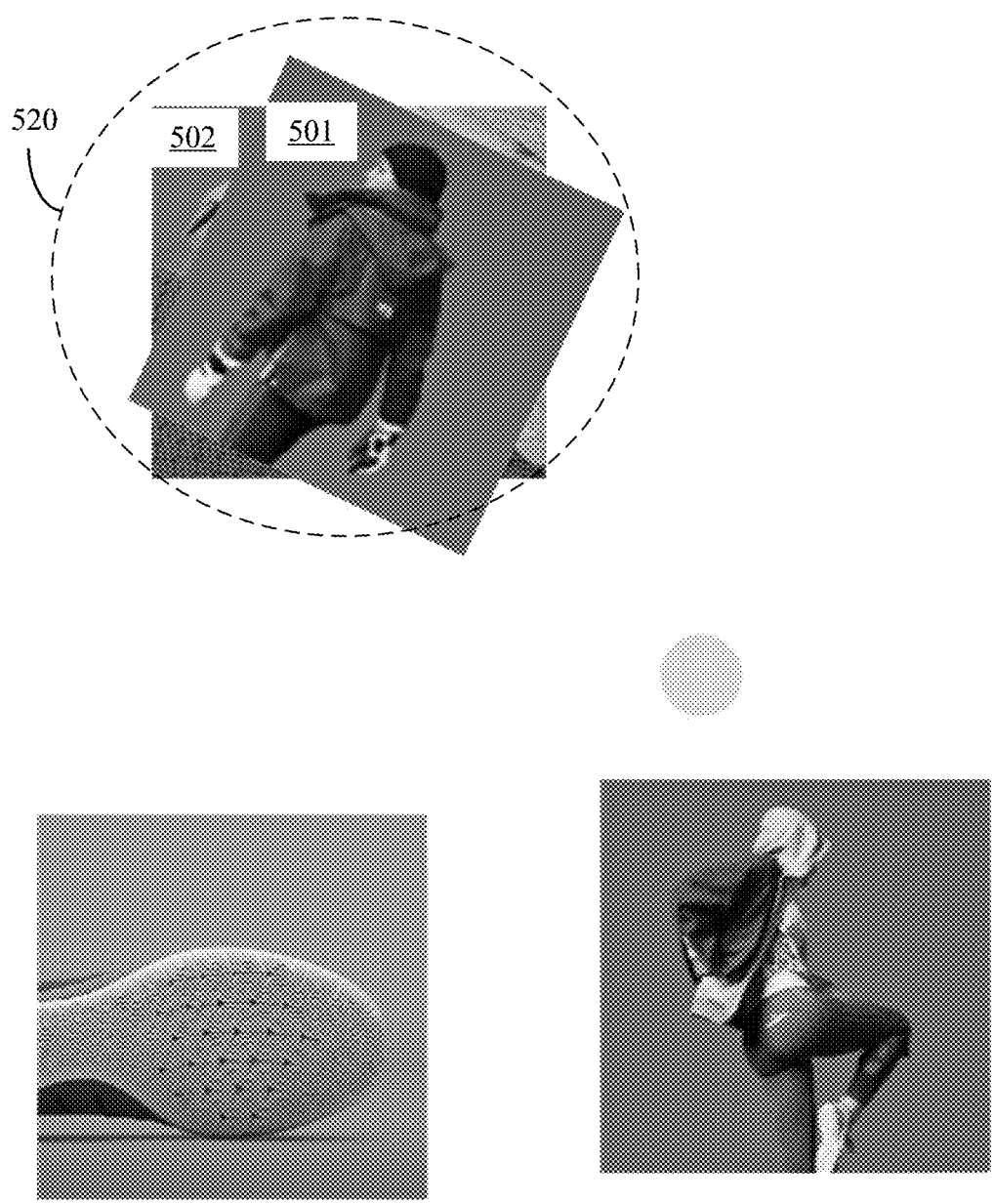
Figure 5G:
Figure 5G:
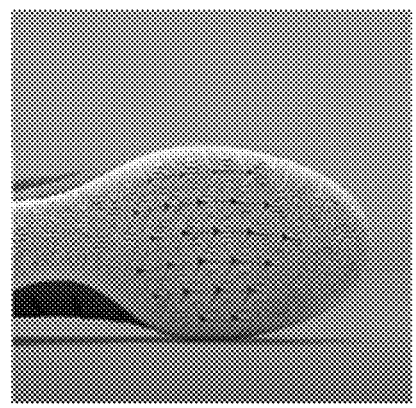
Figure 5H:
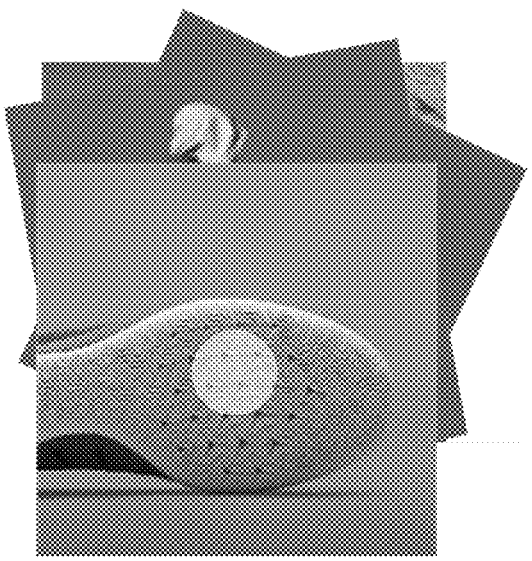
Figure 5I:
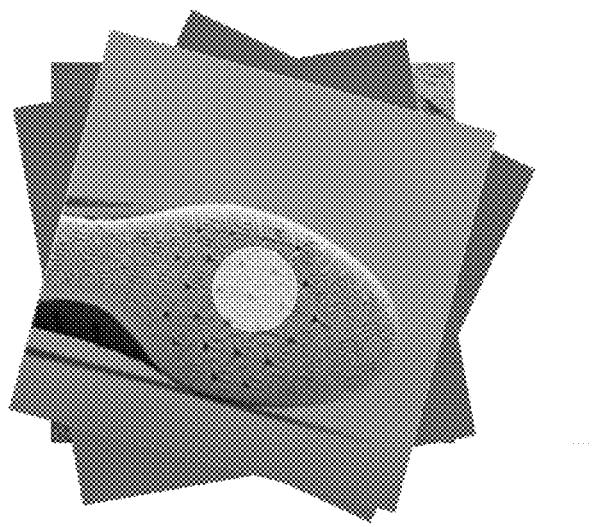
Figure 5J:
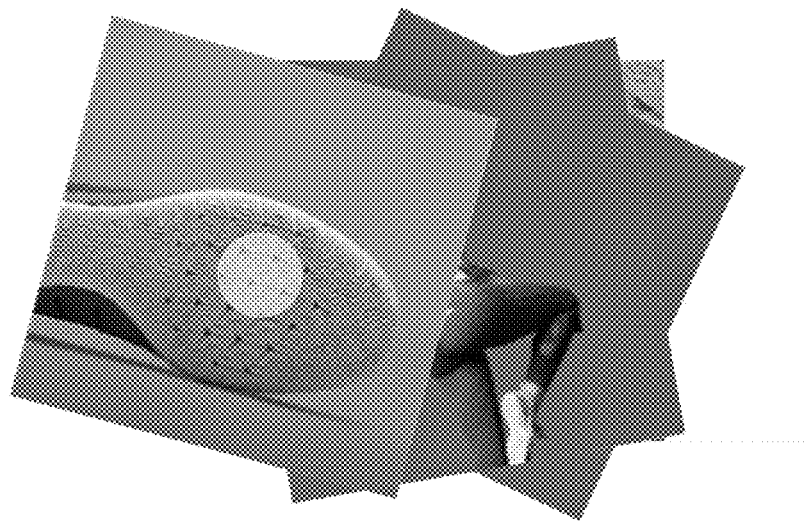
Figure 5K:
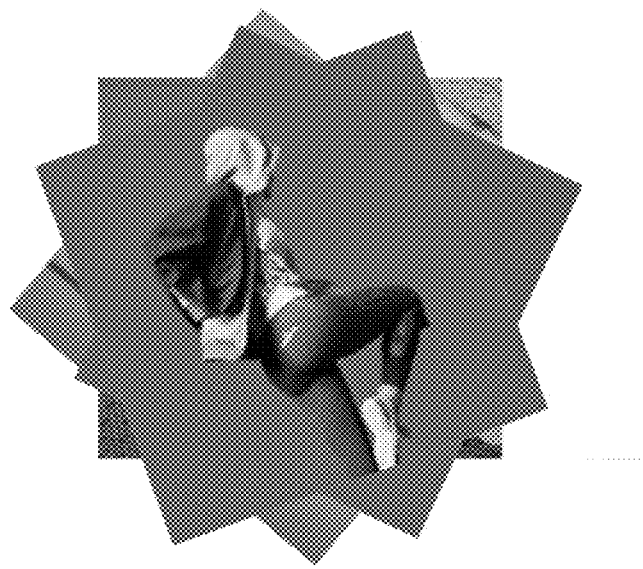
Figure 5L:
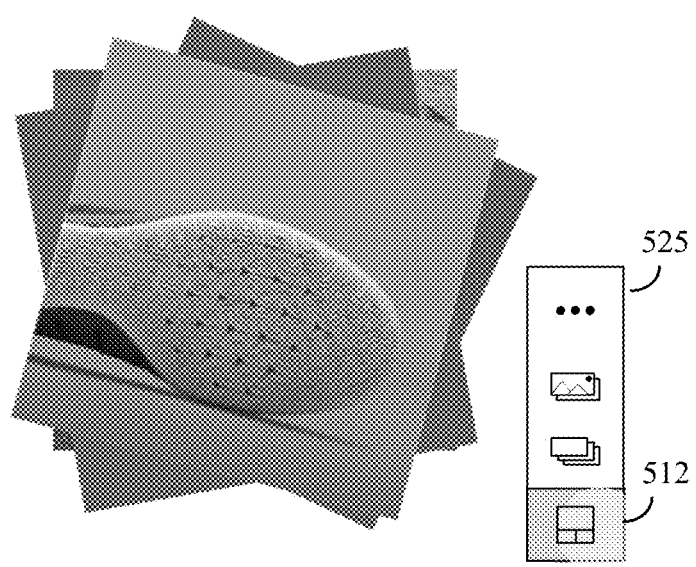
Figure 5M:
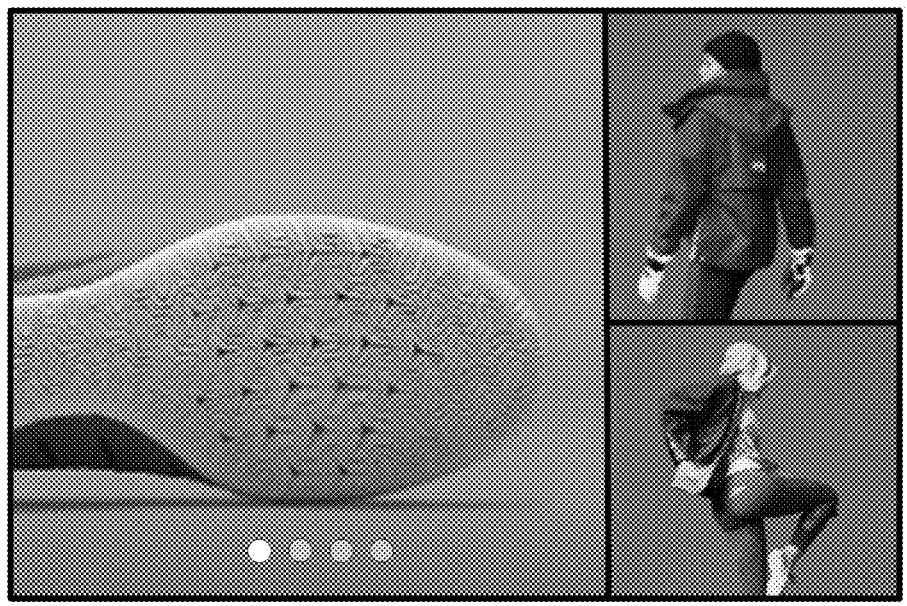
Figure 5N:

FIGS. 5A-5N illustrate an example implementation scenario of object stacks. FIG. 5A illustrates an initial state where a user is working with content in a visual interface 500. In the graphical user interface are four items. Here, the four items are images are of a person walking away (501), a closeup of shoelaces (502), a person facing away in a pirouette (503), and the sole of a shoe (504). The user has written text 505 over and associated with the second item 502. While interacting with the items, a user is dragging the first item 501 towards the second item 502. As shown in FIG. 5C, in some cases, as the first item 501 overlaps the second item 502, a contextual menu indicator 510 may appear. In some cases, in addition to or instead of the contextual menu indicator 510, stacking object command icons may appear. As illustrated, a stack icon 511 and a template icon 512 are available.

As shown in FIGS. 5C and 5D, when a user selects the stack icon 511, the process 100 as described with respect to FIG. 1A may be carried out, resulting in the displaying of the visual representation of the first item 501 and the second item 502 in the stack 520 as shown in FIG. 5D. The text 505 is not shown in this implementation of the stack, but may return to view when the second item 502 is in the front position or when the second item 502 is removed from the stack. Since stack 520 has been generated, the stack can have the properties as described herein above, including being movable as a single item, as shown in FIGS. 5E and 5F. Additional items can be added to the stack 520. For example, the user may drag item 503 to the stack 520 as shown in FIGS. 5F and 5G, which, when the indication to stack is received by the system (via command or via an understood gesture), the newest item is added to the list that is created and the position of the items in the stack can be re-established, such as described with respect to the process 170 in FIG. 1B.

FIGS. 5H-5K illustrate swiping through the stack, which can cause the updated arrangements to form, where none, some, or all items can have a changed position.

FIGS. 5L-5M illustrate a template view and navigation within the template view, which is an example of an exploded view. Referring to FIG. 5L, a template icon 512 can be included in the contextual menu 525 (available when selecting the contextual menu indicator 510). When a user selects the template icon 512, the stack can explode into the template view as shown in FIG. 5M. As shown in FIG. 5N, a user can navigate to see a next item in a larger view for example via navigation controls 530.

Figure 6:
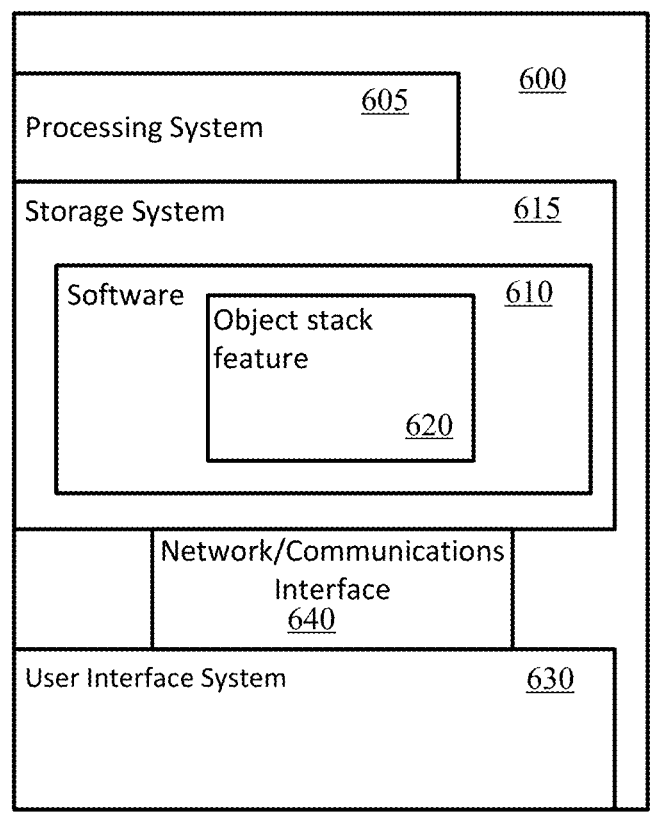
FIG. 6 illustrates components of a computing device that may be used in certain embodiments described herein.

FIG. 6 illustrates components of a computing device that may be used in certain embodiments described herein. Referring to FIG. 6, system 600 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen. Accordingly, more or fewer elements described with respect to system 600 may be incorporated to implement a particular computing device.

System 600 includes a processing system 605 of one or more processors to transform or manipulate data according to the instructions of software 610 stored on a storage system 615. Examples of processors of the processing system 605 include general purpose central processing units (CPUs), graphics processing units (GPUs), field programmable gate arrays (FPGAs), application specific processors, and logic devices, as well as any other type of processing device, combinations, or variations thereof. The processing system 605 may be, or is included in, a system-on-chip (SoC) along with one or more other components such as network connectivity components, sensors, video display components.

Software 610 may be implemented in program instructions and among other functions may, when executed by system 600 in general or processing system 605 in particular, direct system 600 or the one or more processors of processing system 605 to operate as described herein with respect to processes 100 and 170.

The software 610 can include an operating system and application programs any of which can include the object stack feature 620 and processes as described herein. Device operating systems generally control and coordinate the functions of the various components in the computing device, providing an easier way for applications to connect with lower level interfaces like the networking interface. Non-limiting examples of operating systems include WINDOWS from Microsoft Corp., APPLE iOS from Apple, Inc., ANDROID OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 6, can be thought of as additional, nested groupings within the operating system space, each containing an OS, application programs, and APIs.

Storage system 615 may comprise any computer readable storage media readable by the processing system 605 and capable of storing software 610 including the stack object feature 620.

Storage system 615 may include volatile and nonvolatile memories, removable and non-removable media implemented in any method or technology for storage of information, such as computer readable instructions, data structures, program modules, or other data. Examples of storage media of storage system 615 include random access memory, read only memory, magnetic disks, optical disks, CDs, DVDs, flash memory, magnetic cassettes, magnetic tape, magnetic disk storage or other magnetic storage devices, or any other suitable storage media.

Storage system 615 may be implemented as a single storage device but may also be implemented across multiple storage devices or sub-systems co-located or distributed relative to each other. Storage system 615 may include additional elements, such as a controller, capable of communicating with processing system 605.

The system can further include user interface system 630, which may include input/output (I/O) devices and components that enable communication between a user and the system 600. User interface system 630 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 630 may also include output devices such as display screen(s), speakers, haptic devices for tactile feedback, and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

A natural user interface (NUI) may be included as part of the user interface system 630. Examples of NUI methods include those relying on speech recognition, touch and stylus recognition, gesture recognition both on screen and adjacent to the screen, air gestures, head and eye tracking, voice and speech, vision, touch, hover, gestures, and machine intelligence. Accordingly, the systems described herein may include touch sensitive displays, voice and speech recognition, intention and goal understanding, motion gesture detection using depth cameras (such as stereoscopic or time-of-flight camera systems, infrared camera systems, red-green-blue (RGB) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

Visual output may be depicted on the display (not shown) in myriad ways, presenting graphical user interface elements, text, images, video, notifications, virtual buttons, virtual keyboards, or any other type of information capable of being depicted in visual form.

The user interface system 630 may also include user interface software and associated software (e.g., for graphics chips and input devices) executed by the OS in support of the various user input and output devices. The associated software assists the OS in communicating user interface hardware events to application programs using defined mechanisms. The user interface system 630 including user interface software may support a graphical user interface, a natural user interface, or any other type of user interface. For example, the visual interface in which the stack(s) of items are displayed as described herein may be presented through user interface system 630 and graphical user interface(s) displayed therein.

Network interface 640 may include communications connections and devices that allow for communication with other computing systems over one or more communication networks (not shown). Examples of connections and devices that together allow for intersystem communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   displaying a plurality of items in a visual interface;
   receiving an indication to stack two or more items displayed in the visual interface;
   after receiving the indication to stack, creating a stack object comprising a list of the two or more items, a seed value for an ordered seed, and a size value, wherein the ordered seed comprises a pre-stored plurality of values, wherein the seed value is a value from the pre-stored plurality of values of the ordered seed;
   updating an initial arrangement of the two or more items into an ordered arrangement according to an arrangement function, wherein updating the initial arrangement into the ordered arrangement comprises:
      generating the ordered arrangement for a stack of the two or more items by supplying the seed value and the size value to the arrangement function as variables, using the arrangement function to output positions for the two or more items in the stack object based on the seed value, and applying the size value to each item to make each item a same size, wherein applying the size value comprises scaling items of larger size and creating a padding for items of smaller size, wherein for an item of the stack that is in a front, the item is centered on the padding, and for each item of the stack not in the front, the each item is positioned on the padding from a visible corner of the padding; and
      displaying, in the visual interface, each of the two or more items in the ordered arrangement according to the positions, scaling, and padding resulting from the arrangement function;
   receiving an interaction signal that satisfies an activity criterion with respect to the stack; and
   in response to receiving the interaction signal:
      applying a linear increment to the seed value of the ordered seed for the arrangement function to generate an updated seed value;
      generating an updated ordered arrangement for the stack by supplying the updated seed value and the size value to the arrangement function as the variables and using the arrangement function to output updated positions, scaling, and padding for the two or more items in the stack object based on the updated seed value and the size value; and
      displaying, in the visual interface, the stack having the updated ordered arrangement.

2. The method of claim 1, wherein the updated ordered arrangement does not change the position for every item in the stack.

3. The method of claim 1, wherein the activity criterion comprises a front to back move of an item or group of items, a back to front move of an item or a group of items, or a bump interaction with the stack.

4. The method of claim 1, wherein the ordered arrangement is a crest pattern, wherein the arrangement function generates a first orientation position for a front item of the stack, and for each item in the stack behind the front item, in an order of the items in the list of the two or more items, generates positions rotating orientation of the item in a first direction by an increment.

5. The method of claim 1, wherein the ordered arrangement is a random rotation pattern, wherein the arrangement function generates random orientation positions for items of the stack.

6. The method of claim 5, wherein a front item of the stack is positioned upright.

7. The method of claim 1, wherein the ordered arrangement is a random rotation and translation pattern, wherein the arrangement function generates random orientation positions and random translations for items of the stack.

8. The method of claim 1, wherein the ordered arrangement is an alternating rotation pattern, wherein the arrangement function generates a first orientation position for a front item of the stack, and for each item in the stack behind the front item, in an order of the items in the list of the two or more items, generates positions alternating between rotating orientation of the item in one direction by an increment and rotating orientation of the item in an opposite direction by the increment.

9. The method of claim 1, wherein the ordered arrangement is a perturbed alternating rotation pattern, wherein the arrangement function generates a first orientation position for a front item of the stack, and for each item in the stack behind the front item, in an order of the items in the list of the two or more items, generates positions alternating between rotating orientation of the item in one direction and rotating orientation of the item in an opposite direction by an increment, wherein a degree of rotation for the rotating of the orientation of the item is random.

10. The method of claim 1, wherein the ordered arrangement is a scattered alternating rotation pattern, wherein the arrangement function generates a first orientation position for a front item of the stack, and for each item in the stack behind the front item, in an order of the items in the list of the two or more items, generates positions alternating between rotating orientation of the item in one direction and rotating orientation of the item in an opposite direction by an increment, and applying a random translation.

11. The method of claim 1, wherein receiving the indication to stack comprises receiving a release gesture or command while one of the two or more items is over the other one or more of the two or more items.

12. The method of claim 1, wherein receiving the indication to stack comprises receiving a multi-finger pinch gesture with respect to the two or more items.

13. One or more computer-readable storage media having instructions stored thereon that when executed by a processor, direct the processor to at least:
   display a plurality of items in a visual interface;
   receive an indication to stack two or more items displayed in the visual interface;
   after receiving the indication to stack, create a stack object comprising a list of the two or more items, a seed value for an ordered seed, and a size value, wherein the ordered seed comprises a pre-stored plurality of values, wherein the seed value is a value from the pre-stored plurality of values of the ordered seed;
   update an initial arrangement of the two or more items into an ordered arrangement according to an arrangement function, wherein updating the initial arrangement into the ordered arrangement comprises:

generate the ordered arrangement for a stack of the two or more items by supplying the seed value and the size value to the arrangement function as variables, using the arrangement function to output positions for the two or more items in the stack object based on the seed value, and applying the size value to each item to make each item a same size, wherein applying the size value comprises scaling items of larger size and creating a padding for items of smaller size, wherein for an item of the stack that is in a front, the item is centered on the padding, and for each item of the stack not in the front, the each item is positioned on the padding from a visible corner of the padding; and display, in the visual interface, each of the two or more items in the ordered arrangement according to the positions, scaling, and padding resulting from the arrangement function, wherein each item of the stack has a corresponding visual representation in the stack;

receive an interaction signal that satisfies an activity criterion with respect to the stack;

in response to the interaction signal:

apply a linear increment to the seed value of the ordered seed for the arrangement function to generate an updated seed value;

generate an updated ordered arrangement for the stack by supplying the updated seed value and the size value to the arrangement function as the variables and using the arrangement function to output updated positions, scaling, and padding for the two or more items in the stack object based on the updated seed value and the size value; and display, in the visual interface, the stack having the updated ordered arrangement.

14. The media of claim 13, wherein the activity criterion comprises a front to back move of an item or group of items, a back to front move of an item or a group of items, or a bump interaction with the stack.

15. The media of claim 13, wherein the ordered arrangement and the updated ordered arrangement are both a crest pattern, an alternating rotation pattern, a perturbed alternating rotation pattern, or a scattered alternating rotation pattern.

16. A system comprising:
a processor;
a visual interface;
one or more computer-readable storage media; and
instructions stored on the one or more computer-readable storage media for arranging a stack of items in the visual interface, the instructions directing the processor to at least:

display a plurality of items in the visual interface;

receive an indication to stack two or more items displayed in the visual interface;

after receiving the indication to stack, create a stack object comprising a list of the two or more items, a seed value for an ordered seed, and a size value, wherein the ordered seed comprises a pre-stored plurality of values, wherein the seed value is a value from the pre-stored plurality of values of the ordered seed;

update an initial arrangement of the two or more items into an ordered arrangement according to an arrangement function, wherein updating the initial arrangement into the ordered arrangement comprises:

generate the ordered arrangement for the stack of the two or more items by supplying the seed value and the size value to the arrangement function as variables, using the arrangement function to output positions for the two or more items in the stack object based on the seed value, and applying the size value to each item to make each item a same size, wherein applying the size value comprises scaling items of larger size and creating a padding for items of smaller size, wherein for an item of the stack that is in a front, the item is centered on the padding, and for each item of the stack not in the front, the each item is positioned on the padding from a visible corner of the padding; and display, in the visual interface, each of the two or more items in the ordered arrangement according to the positions, scaling, and padding resulting from the arrangement function, wherein each item of the stack has a corresponding visual representation in the stack;

receive an interaction signal that satisfies an activity criterion with respect to the stack; and in response to receiving the interaction signal:

apply a linear increment to the seed value of the ordered seed for the arrangement function to generate an updated seed value;

generate an updated ordered arrangement for the stack by supplying the updated seed value and the size value to the arrangement function as the variables and using the arrangement function to output updated positions, scaling, and padding for the two or more items in the stack object based on the updated seed value and the size value; and display, in the visual interface, the stack having the updated ordered arrangement.

* * * * *